United States Patent
Bishop

(10) Patent No.: US 10,040,540 B2
(45) Date of Patent: Aug. 7, 2018

(54) LINK FOR COUPLING AN AIRCRAFT LIFT DEVICE TO A TRACK

(71) Applicant: AIRBUS OPERATIONS LIMITED, Bristol (GB)

(72) Inventor: Ben Bishop, Bristol (GB)

(73) Assignee: Airbus Operations Limited, Bristol (GB)

(*) Notice: Subject to any disclaimer, the term of this patent is extended or adjusted under 35 U.S.C. 154(b) by 119 days.

(21) Appl. No.: 14/860,981

(22) Filed: Sep. 22, 2015

(65) Prior Publication Data
US 2016/0083082 A1 Mar. 24, 2016

(30) Foreign Application Priority Data

Sep. 22, 2014 (GB) .................................. 1416665.6

(51) Int. Cl.
| | |
|---|---|
| *B64C 13/34* | (2006.01) |
| *B64C 9/02* | (2006.01) |
| *B64C 9/16* | (2006.01) |
| *B64C 9/24* | (2006.01) |

(52) U.S. Cl.
CPC .............. *B64C 13/34* (2013.01); *B64C 9/02* (2013.01); *B64C 9/16* (2013.01); *B64C 9/24* (2013.01); *Y02T 50/32* (2013.01)

(58) Field of Classification Search
CPC .... B64C 9/02; B64C 9/04; B64C 9/08; B64C 9/22; B64C 9/24; B64C 13/24; B64C 13/26; B64C 13/28
USPC ................................................. 244/213, 214
See application file for complete search history.

(56) References Cited

U.S. PATENT DOCUMENTS

| | | | | |
|---|---|---|---|---|
| 4,687,162 A | * | 8/1987 | Johnson ..................... | B64C 9/24 244/213 |
| 4,753,402 A | * | 6/1988 | Cole ......................... | B64C 9/22 244/210 |
| 2002/0005462 A1 | * | 1/2002 | Broadbent ................ | B64C 9/22 244/214 |
| 2007/0034747 A1 | * | 2/2007 | Amorosi ................. | B64C 13/24 244/215 |
| 2007/0045477 A1 | * | 3/2007 | Armstrong ................ | B64C 9/22 244/214 |
| 2010/0116944 A1 | * | 5/2010 | Wollaston ................. | B64C 9/24 244/214 |
| 2011/0006155 A1 | * | 1/2011 | Kracke ..................... | B64C 9/02 244/99.3 |
| 2011/0101175 A1 | * | 5/2011 | Lauwereys ............... | B64C 9/22 244/213 |
| 2011/0290946 A1 | * | 12/2011 | Pierce ................ | B64D 45/0005 244/213 |
| 2012/0241564 A1 | * | 9/2012 | Parker ...................... | B64C 9/22 244/214 |

(Continued)

*Primary Examiner* — Tien Q Dinh
*Assistant Examiner* — Brady W Frazier
(74) *Attorney, Agent, or Firm* — Nixon & Vanderhye P.C.

(57) ABSTRACT

A link for coupling an aircraft lift device to a track that is deployable about an axis of rotation. The link includes a track member to be fixed relative to the track, a lift device member to be fixed relative to the lift device, and an intermediate member that couples the track member to the lift device member. The link is configured to allow for sliding movement of the lift device member relative to the track member such that the lift device is slidable along a linear path relative to the track in a direction of the axis of rotation of the track.

23 Claims, 15 Drawing Sheets

(56) References Cited

U.S. PATENT DOCUMENTS

2014/0042276 A1* 2/2014 Parker .................. B64C 9/02
 244/214
2014/0339358 A1* 11/2014 Swartley ............... H01R 41/00
 244/99.3

* cited by examiner

LINK FOR COUPLING AN AIRCRAFT LIFT DEVICE TO A TRACK

RELATED APPLICATION

This application claims priority to U.K. patent application GB 1416665.6 filed on Sep. 22, 2014, the entirety of which is incorporated by reference.

TECHNICAL FIELD

The present invention relates to a link for coupling an aircraft lift device to a track and to an aircraft structure comprising the same. The present invention also relates to an aircraft comprising such an aircraft structure.

BACKGROUND

Conventional aircraft typically comprise lift devices to control the coefficient of lift of the wings so that the aircraft can fly at slower speeds during landing or when performing maneuvers. Each lift device, for example, a flap or slat, comprises an aerodynamic surface that is moved relative to an edge of the aircraft wing to control the angle of attack of the wing.

The lift device is moved relative to the aircraft wing by a lift device actuating mechanism. The lift device actuating mechanism comprises a track, a pinion gear, and a track container that receives the pinion gear. The lift device is coupled to an end of the track by a drop link. It has been found that, due to the effects of wing bending, conventional drop links are not suitable for use with lift devices that have a large spanwise dimension.

SUMMARY

A novel link has been invented and is disclosed herein for coupling an aircraft lift device to a track that is deployable about an axis of rotation comprising a track member to be fixed relative to said track, a lift device member to be fixed relative to said lift device, and an intermediate member that couples the track member to the lift device member, wherein the link is configured to allow for sliding movement of the lift device member relative to the track member such that said lift device is slidable along a linear path relative to said track in a direction of the axis of rotation of said track.

In one embodiment, one of the track member and lift device member is slidable relative to the intermediate member. Said one of the track member and lift device member may comprise a recess and the intermediate member is slidably received in the recess.

The other one of the track member and lift device member may be rotatable relative to the intermediate member about a first axis. The other one of the track member and lift device member may comprise first and second arms and the intermediate member may be rotatably received between the first and second arms such that the first axis extends therebetween.

In one embodiment, said one of the track member and lift device member is rotatable relative to the intermediate member about a second axis perpendicular to the first axis. The first and second axes may be perpendicular to the axis of rotation of said track.

In one embodiment, said one of the track member and lift device member comprises a slot and the intermediate member comprises a protrusion that slidably engages with the slot. In one such embodiment, said one of the track member and lift device member comprises an opposing pair of slots and the intermediate member comprises a pair of protrusions that are configured to each slidably engage with a respective slot. The protrusion(s) may be rotatably received in the slot(s) such that said one of the track member and lift device member is rotatable relative to the intermediate member about the second axis.

The intermediate member may be generally cruciform shaped. Said one of the track member and lift device member may be generally box-shaped.

The intermediate member may be configured to restrict said lift device from rotating relative to said track about any axis that is parallel to the axis of rotation of said track.

The track member may be coupled to the track by first and second pins.

The first pin may comprise an eccentric member configured to allow for adjustment of the angle of the track member relative to the track about a rotational axis of the second pin.

In one embodiment, the link is configured such that the track member is constrained to three degrees of freedom relative to the lift device member.

The lift device member may comprise a plurality of bolt holes for attachment of the lift device to the lift device member.

In one embodiment, when the lift device is mounted to the lift device member no further attachment of the lift device is required to secure the lift device to the track.

The link may be configured to couple a slat to a slat track.

According to another aspect of the invention, there is provided an aircraft structure comprising the link according to the invention. In one embodiment, the link is configured such that the lift device is slidable relative to the track in the spanwise direction of the aircraft structure.

According to another aspect of the invention, there is provided an aircraft comprising the aircraft structure according to the invention.

DETAILED DESCRITPION

Figure 1:
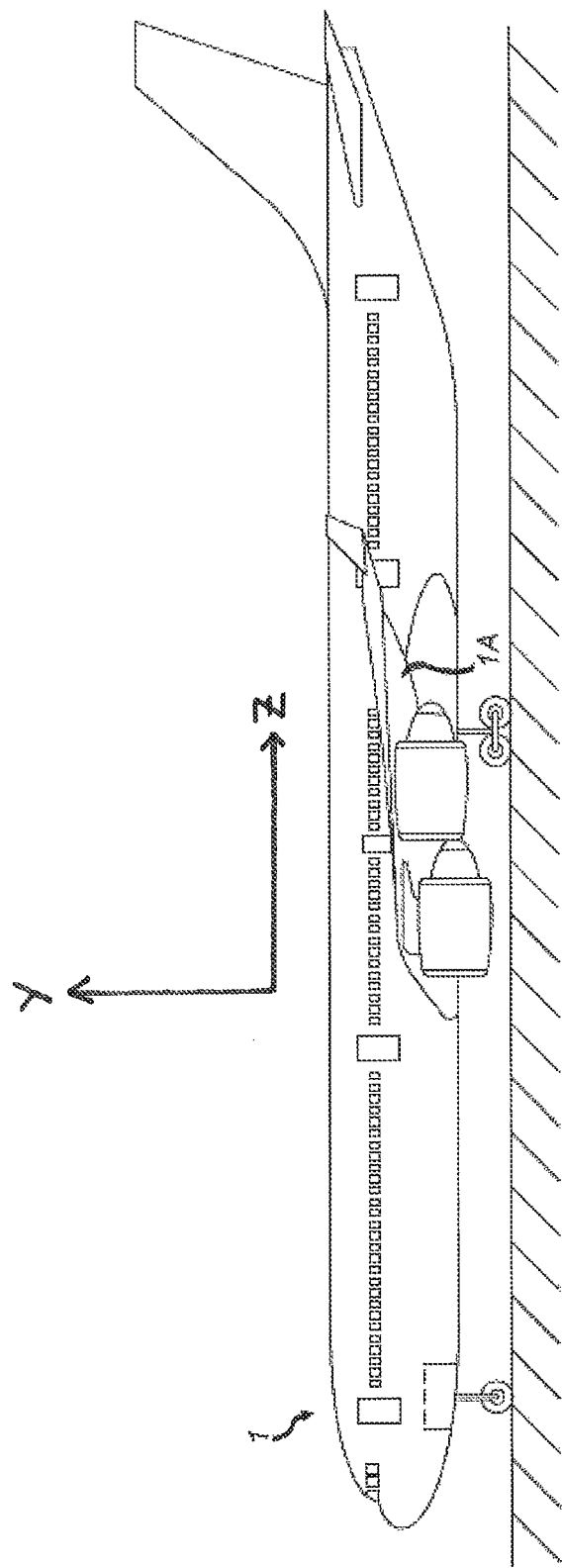
FIG. 1 is a side view of an aircraft comprising a known wing assembly.
Figure 2:
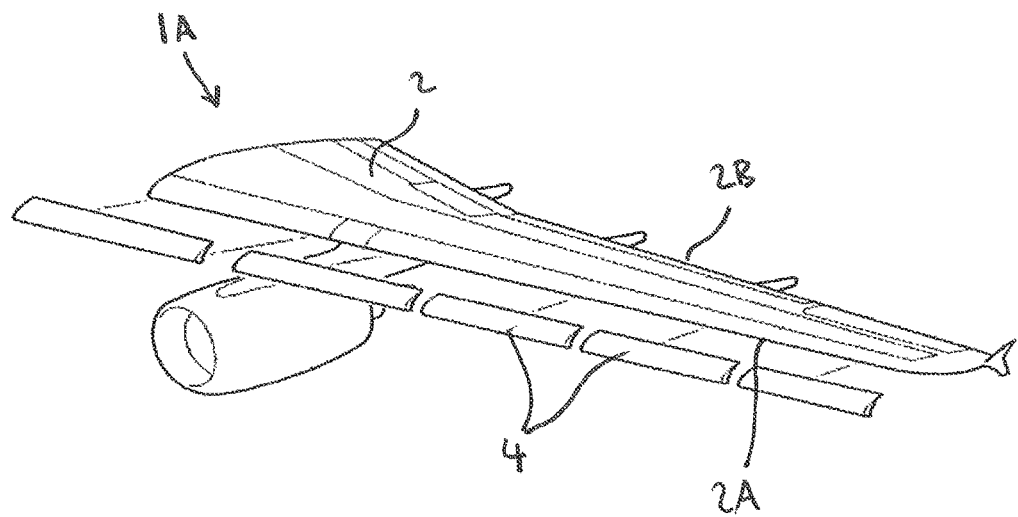
FIG. 2 is a perspective view of the known wing assembly of FIG. 1.

Referring to FIGS. 1 to 7B, an aircraft 1 comprising a known wing assembly 1A is shown. The wing assembly 1A comprises a wing body 2 having a leading edge 2A and a trailing edge 2B. The wing body 2 comprises upper and lower covers and a fuel tank (not shown) that is disposed on the inside of the wing body 2.

The wing assembly 1A has a plurality of lift devices each in the form of a slat 4 that is moveable relative to the leading edge 2A of the wing body 2 by a corresponding actuating mechanism 5. Each slat 4 comprises an aerodynamic surface that is moveable relative to the wing body 2 to control the lift coefficient of the wing assembly 1A, as is well known in the art.

Each actuating mechanism 5 comprises first and second tracks 6A, 6B that are coupled to one of the slats 4. The first track 6A is configured to be moved by a first pinion gear (not shown) such that the first track 6A is moved into or out of a first track container (not shown). The second track 6B is configured to be moved by a second pinion gear (not shown) such that the second track 6B is moved into or out of a second track container (not shown). The first and second tracks 6A, 6B are guided by a first set of rollers (not shown) and a second set of rollers 8 respectively.

The first and second tracks 6A, 6B are arcuate and rotate about their theoretical centre or axis (not shown) to urge the slat 4 to rotate relative to the wing body 2 between a deployed position and a cruise position. The first and second tracks 6A, 6B rotate about the same axis, which extends longitudinally along the width of the slat 4, as is conventional.

The first and second track containers are disposed in the wing body 2 and extend into the fuel tank 3. The first and second track containers are generally curved to correspond to the curvatures of the first and second tracks 6A, 6B respectively.

When the slat 4 is in the cruise position, a substantial portion of the first and second tracks 6A, 6B are received in the first and second track containers respectively and the slat 4 is located proximate to the leading edge 2A of the wing body 2. In the cruise position, the slat 4 is positioned to minimize the aerodynamic drag of the wing assembly 1A to increase the cruising speed of the aircraft 1.

To move the slat 4 to the deployed position, the first and second pinion gears 7 are rotated, for example by a hydraulic actuator (not shown), to urge the first and second tracks 6A, 6B out of the first and second track containers respectively such that the slat 4 rotates downwardly in an arcuate path away from the leading edge 2A of the wing body 2. When the slat 4 is in the deployed position, the first and second tracks 6A, 6B extend out of the wing body 2 and the slat 4 is spaced from the leading edge 2A such that the lift coefficient of the wing assembly 1A is increased to reduce the stall speed of the aircraft 1 for landing and the length of runway required for takeoff The first track 6A is coupled to the slat 4 by a master drop link 9. The master drop link 9 is configured such that the slat 4 is fixed relative to the first track 6A in a spanwise direction X of the aircraft 1 to carry any spanwise loading that is exerted on the slat 4.

The second track 6B is coupled to the slat 4 by a slave drop link 10. The slave drop link 10 is coupled to a mount 4A that extends from the slat 4. The slave drop link 10 is spaced from the master drop link 9 in the spanwise direction X of the aircraft 1 such that the first and second tracks 6A, 6B are parallel and spaced from each other. The first track 6A is located inboard of the second track 6B.

During flight, the wing body 2 is subject to aerodynamic loads. More specifically, the wing body 2 is subject to lift loads in an out-of-plane direction Y of the aircraft 1 and drag loads in a chordwise direction Z of the aircraft 1.

Figure 3:
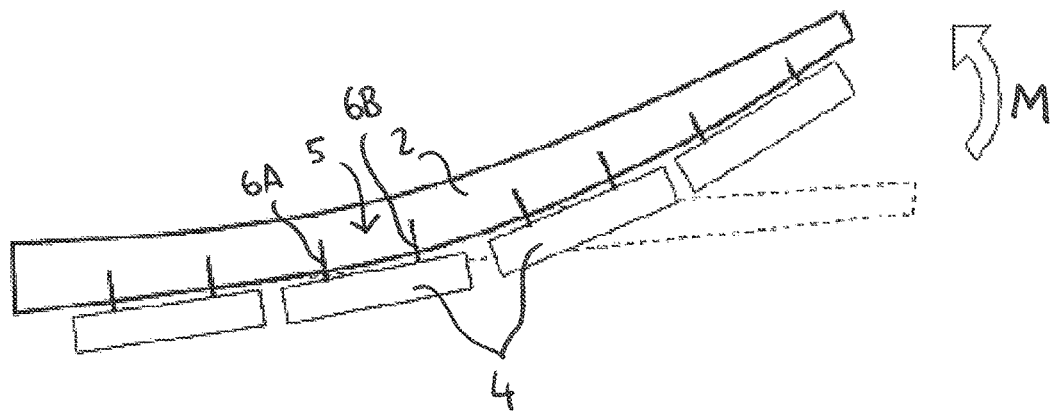
FIG. 3 is a schematic aft view of the known wing assembly of FIG. 1.
Figure 4:
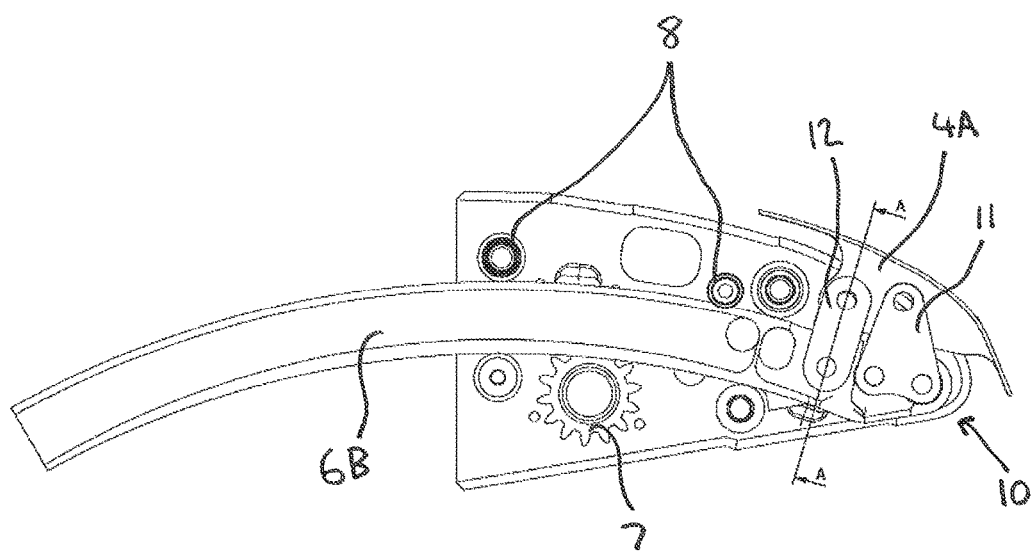
FIG. 4 is a cross-sectional side view of the wing assembly of FIG. 1, showing a slave drop link.
Figure 5:
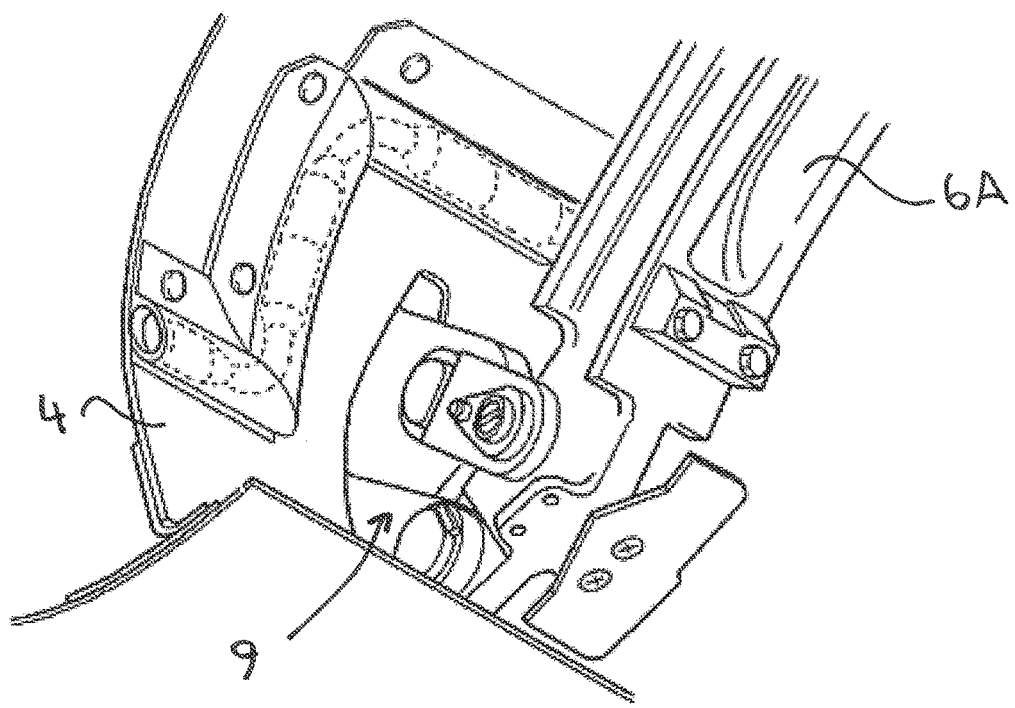
FIG. 5 is a perspective view of a master drop link of the wing assembly of FIG. 1.

The lift load results in an out-of plane bending moment M being exerted on the wing body 2 such that the wing body 2 is bent upwardly from a rest position (as shown by the dashed lines of FIG. 3) to a deflected position (as shown by the solid lines of FIG. 3). The out-of-plane bending moment M urges the wing body 2 to bend upwardly about an axis (not shown) that is parallel to the chordwise direction Z of the aircraft 1.

If the first and second tracks 6A, 6B were both fixed rigidly to the slat 4, then a large spanwise load would be exerted on the slat 4, the first and second tracks 6A, 6B, and the master and slave drop links 9, 10 when the wing body 2 is subjected to out-of plane bending. Therefore, to reduce such spanwise loading, the slave drop link 10 is configured to allow for spanwise movement between the slat 4 and the second track 6B such that the position of the slat 4 relative to the second track 6B can change as the wing body 2 bends.

The slave drop link 10 comprises a generally triangular link plate 11 and a link arm 12. The link plate 11 is coupled to the second track 6B by first and second spherical bearings 13A, 13B and the link arm 12 is coupled to the second track 6B by a third spherical bearing 14 such that the link plate 11 and link arm 12 are able to swing relative to the second track 6B in the spanwise direction X. Furthermore, the link plate 11 is coupled to the slat 4 by a fourth spherical bearing 15 and the link arm 12 is coupled to the slat 4 by a fifth spherical bearing 16 such that the link plate 11 and link arm 12 are able to swing relative to the slat 4 in the spanwise direction X. Therefore, the slat 4 is able to swing through an arc relative to the second track 6B about an axis that is perpendicular to the spanwise direction X to allow for movement of the slat 4 relative to the second track 6B in the spanwise direction X.

Figure 6:
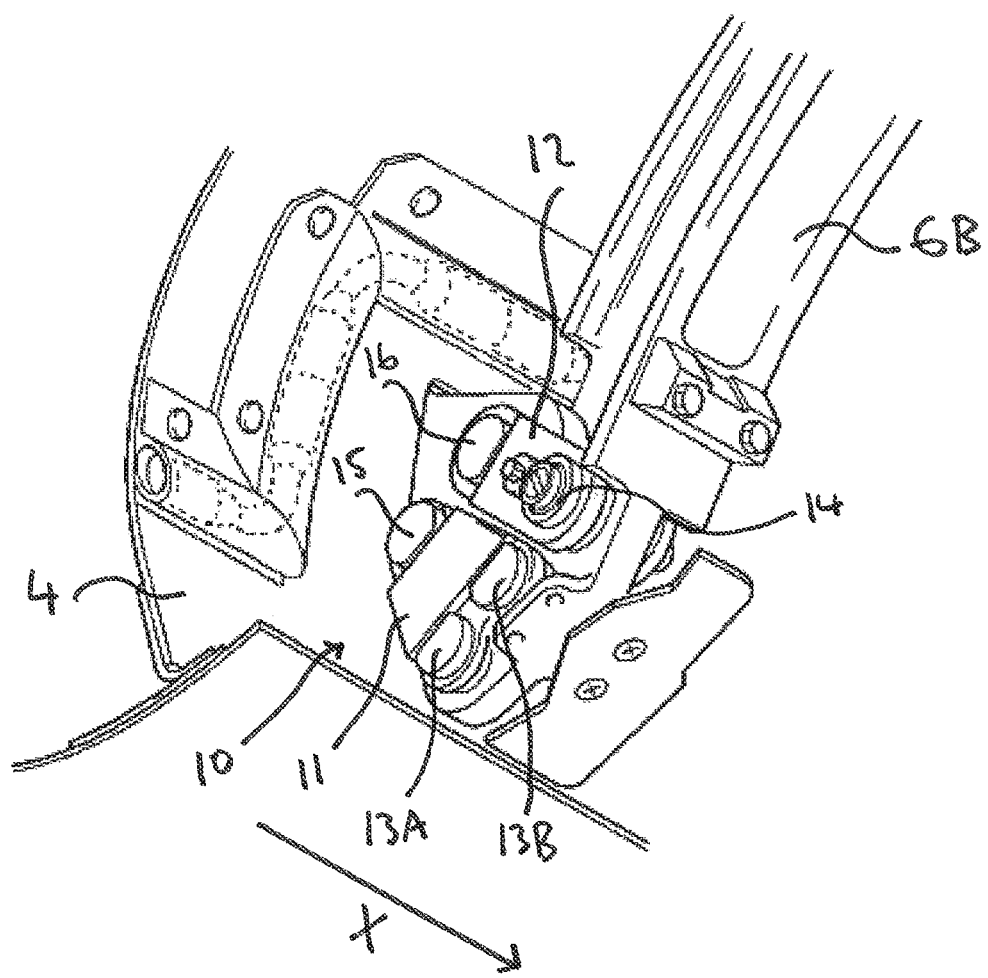
FIG. 6 is a perspective view of the slave drop link of the wing assembly of FIG. 1.
Figure 7A:
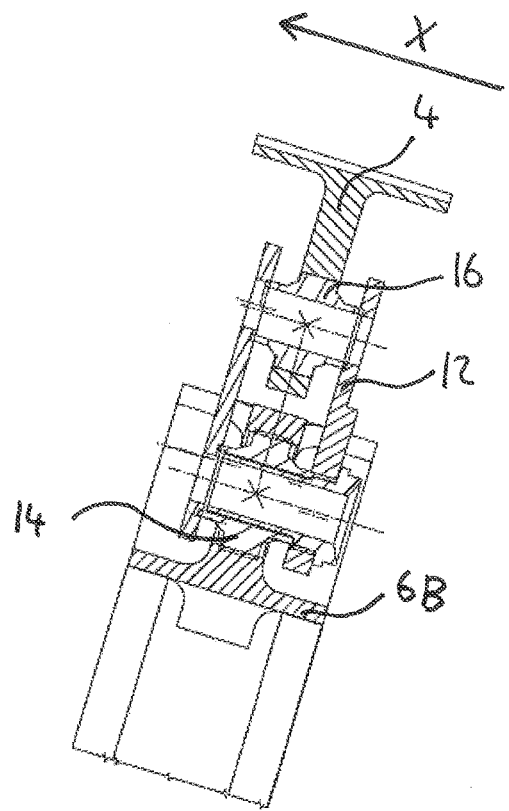
FIG. 7A is a cross-sectional view along the line A-A of a portion of the slave drop link of FIG. 4, in a first position.

When the wing body 2 is in the rest position, the link plate 11 and link arm 12 are substantially parallel to the chordwise direction Z (as shown in FIGS. 6 and 7A). Additionally, the first, second and fourth spherical bearings 13A, 13B, 15 are aligned in the spanwise direction X and the third and fifth spherical bearings 14, 16 are aligned in the spanwise direction X.

Figure 7B:
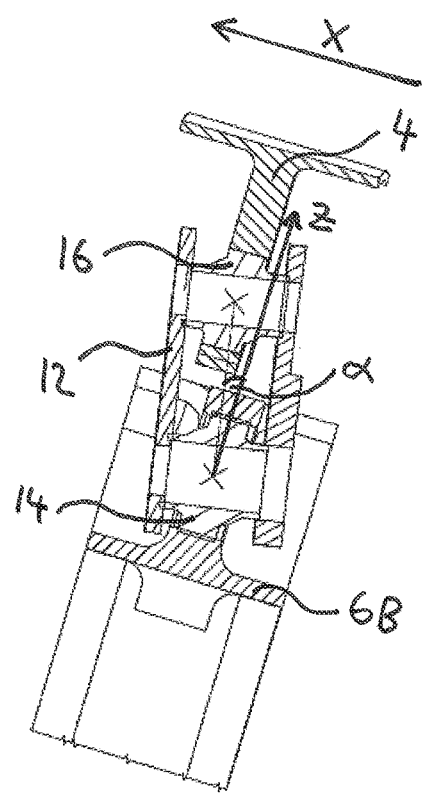
FIG. 7B is a cross-sectional view along the line A-A of a portion of the slave drop link of FIG. 4, in a second position.

When the wing body 2 is subjected to out-of-plane bending, the slat 4 swings relative to the second track 6B to facilitate movement therebetween in the spanwise direction X to prevent a large spanwise load from being exerted on the slave drop link 10 and the slat 4 and second track 6B. This results in the link plate 11 and link arm 12 swinging relative to the slat 4 and second track 6B such that the link plate 11 and link arm 12 are at an angle α with respect to the chordwise direction Z (as shown in FIG. 7B).

It has been found that the slave drop link 10 is not suited to applications wherein a large displacement between the slat 4 and second track 6B is required. This is because the amount of spanwise loading exerted on the slave drop link 10 and the slat 4 and second track 6B increases as the angle α of each of the link plate 11 and link arm 12 with respect to the chordwise direction Z increases.

More specifically, as the slat 4 swings through an arc relative to the second track 6B due to out-of plane bending such that the angle a of the link plate 11 and link arm 12 with respect to the chordwise direction Z increases, the amount of spanwise loading being exerted on the slave drop link 10 will increase and an increasingly large tension load will be exerted on the link plate 11 and link arm 12.

This large tension load requires reinforcement of the slave drop link 10 and the slat 4 and second track 6B, which adds weight to the wing assembly 1A. In addition, the amount of relative spanwise movement of the slat 4 relative to the second track 6B is limited by the range of tilting movement of the first, second, third, fourth and fifth spherical bearings 13A, 13B, 14, 15, 16. Furthermore, when there is a large spanwise displacement between the slat 4 and the second track 6B the link plate 11 and link arm 12 will abut the slat 4 and/or second track 6B such that the maximum swinging movement of slat 4 relative to the second track 6B is limited.

A large spanwise displacement between the slat 4 and the second track 6B is necessary when the first and second tracks 6A, 6B are spaced far apart in the spanwise direction X. Therefore, the slave drop link 10 is not suitable of use in wing assemblies 1A that comprise a slat 4 with a large spanwise dimension.

Figure 8:
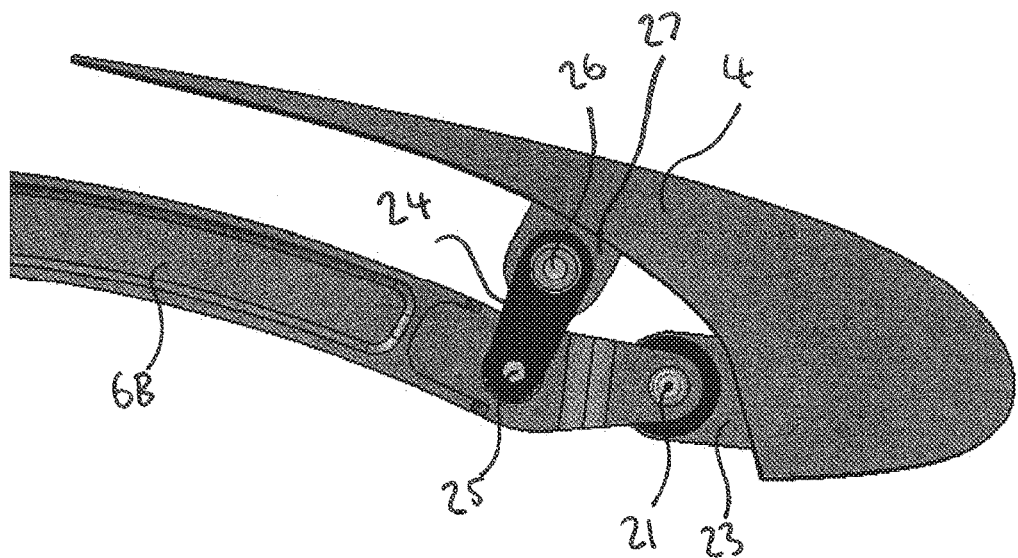
FIG. 8 is a side view of a portion of a second known wing assembly.
Figure 9:
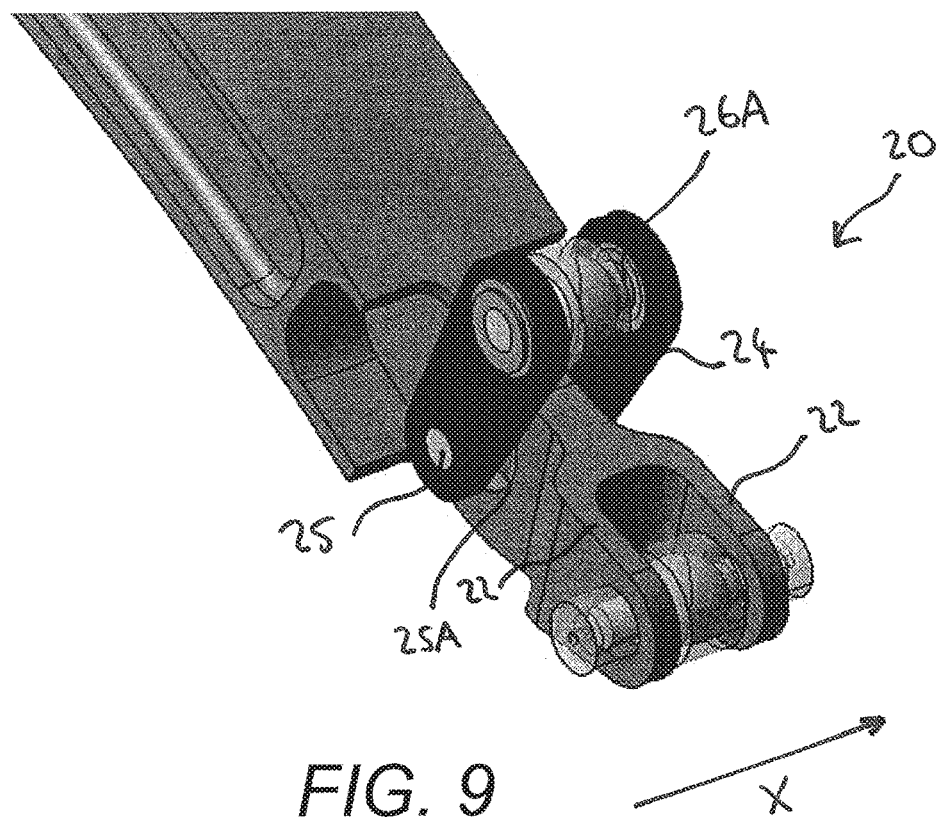
FIG. 9 is a perspective view of a slave drop link of the wing assembly of FIG. 8.
Figure 10:
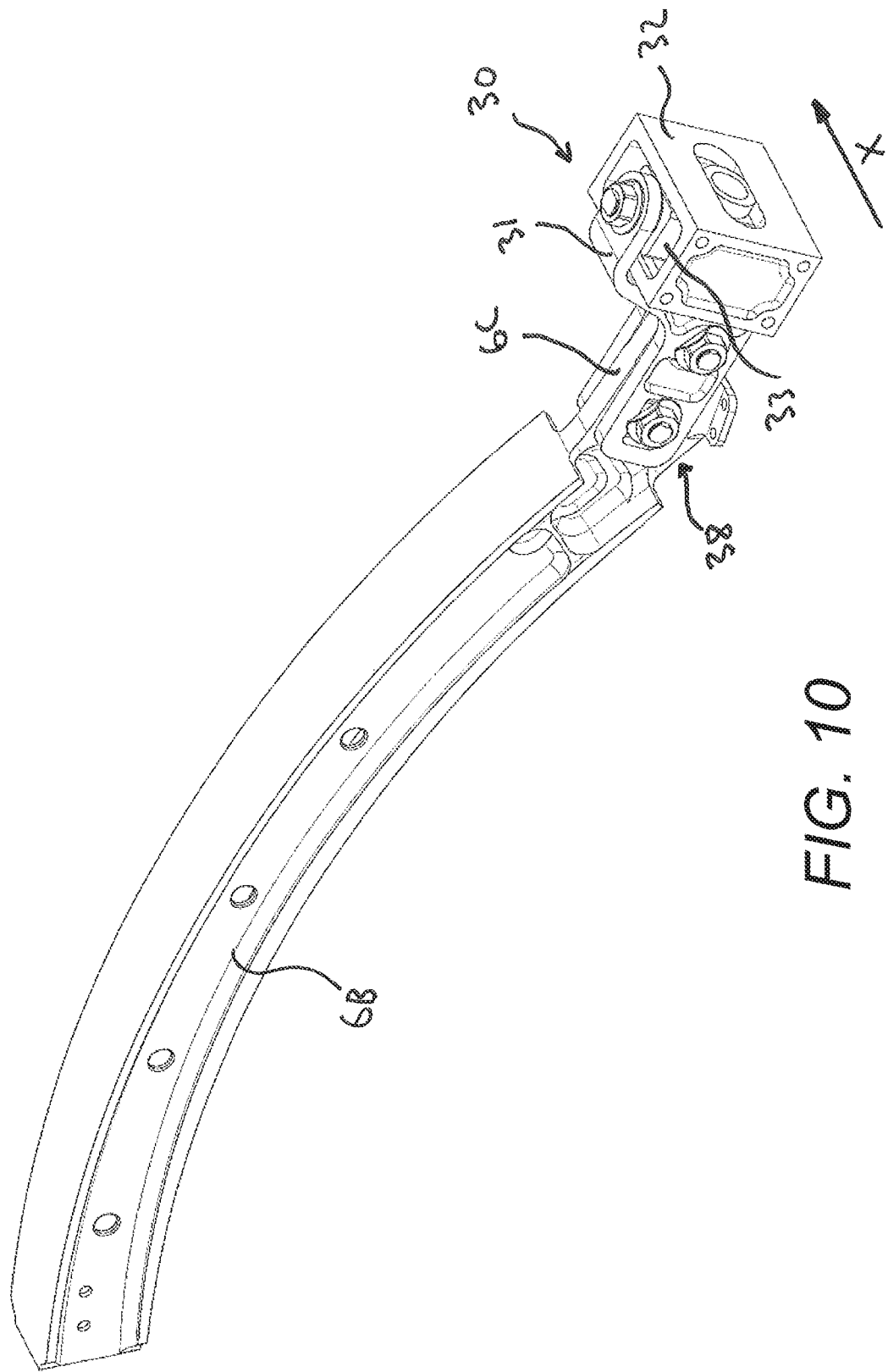
FIG. 10 is a perspective view of a coupling according to an embodiment of the invention, coupled to a slat track.
Figure 11:
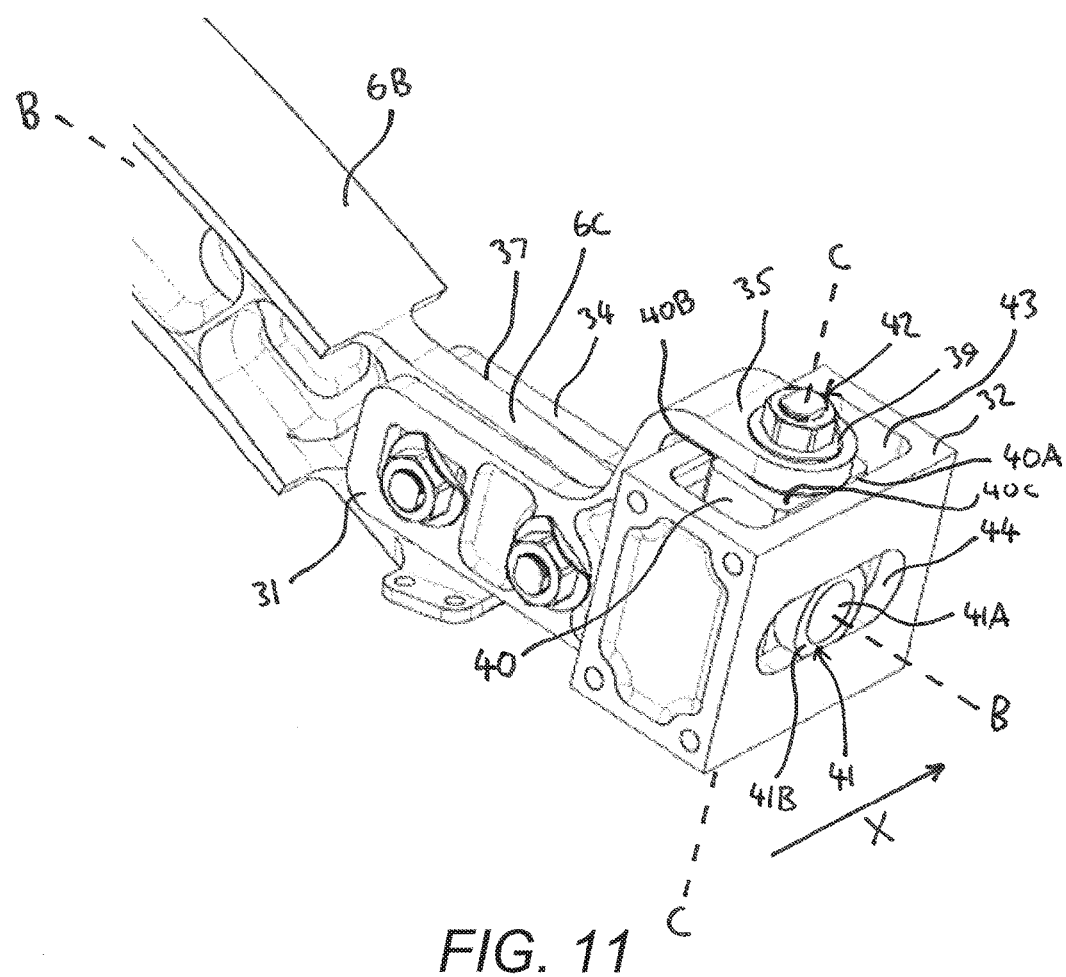
FIG. 11 is a close-up perspective view of the coupling of FIG. 10.
Figure 12:
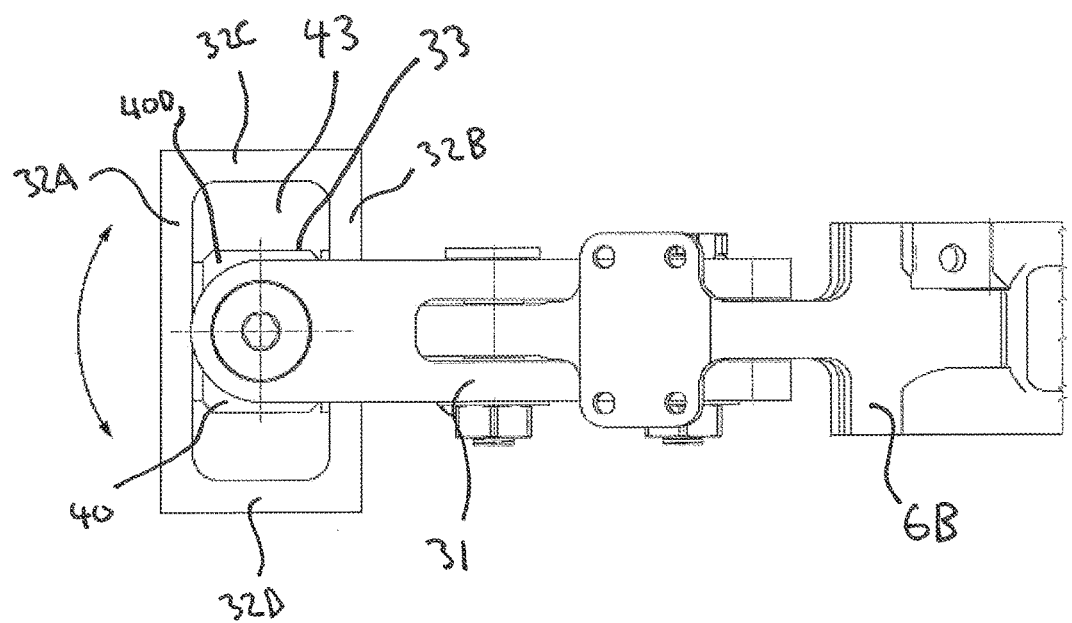
FIG. 12 is a bottom view of the coupling of FIG. 10.
Figure 13:
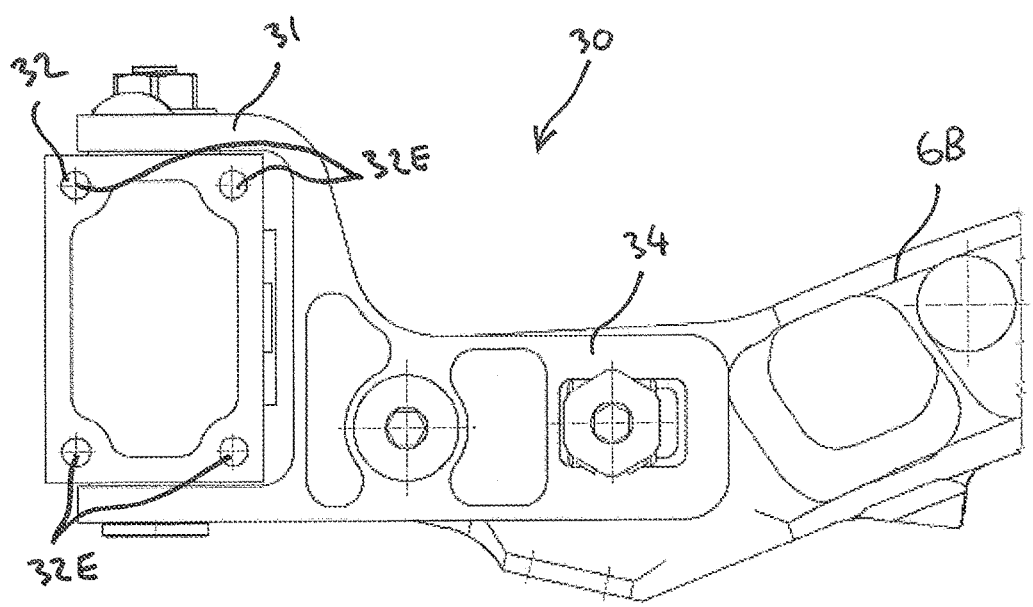
FIG. 13 is a side view of the coupling of FIG. 10.
Figure 14:
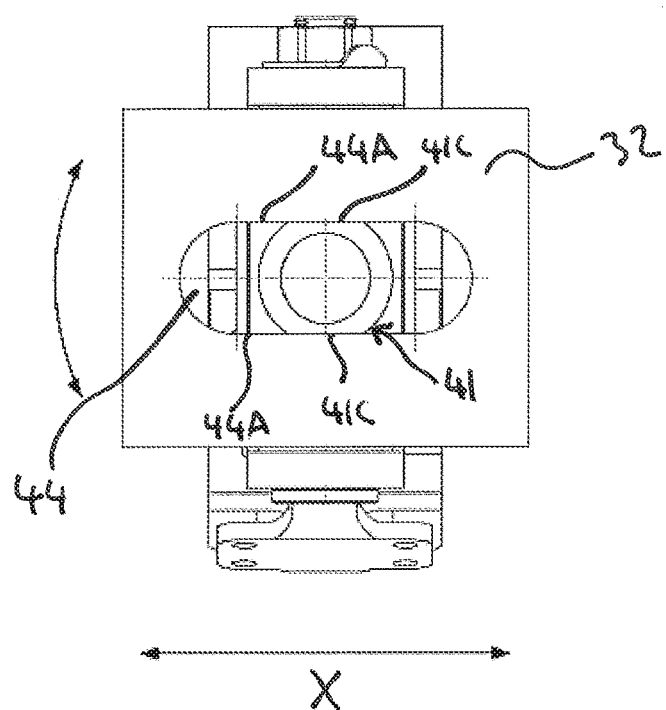
FIG. 14 is a front view of the coupling of FIG. 10.
Figure 15:
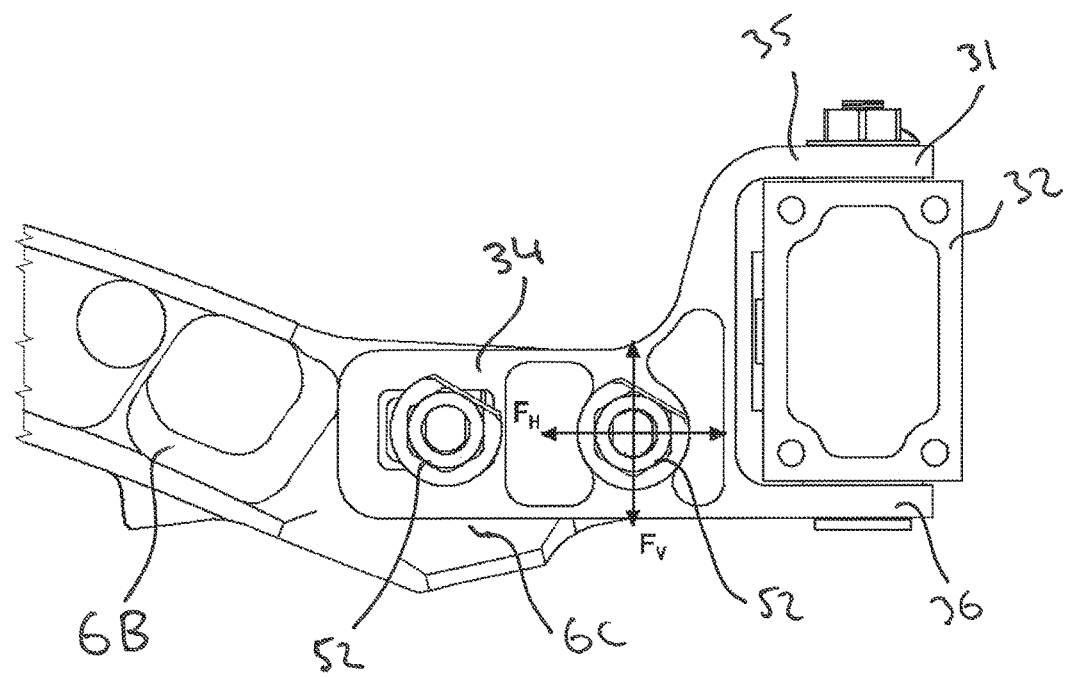
FIG. 15 is a second side view of the coupling of FIG. 10.
Figure 16:
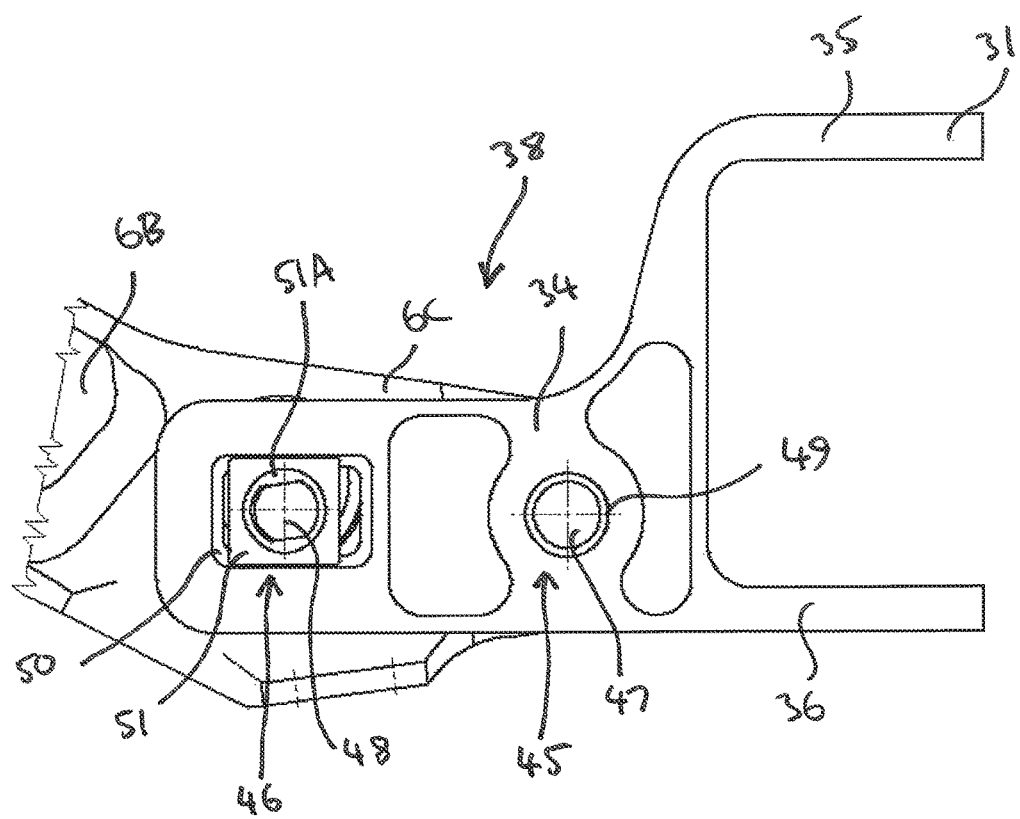
FIG. 16 is a side view of a portion of the coupling of FIG. 10, showing a track member in a first position relative to a track.
Figure 17:
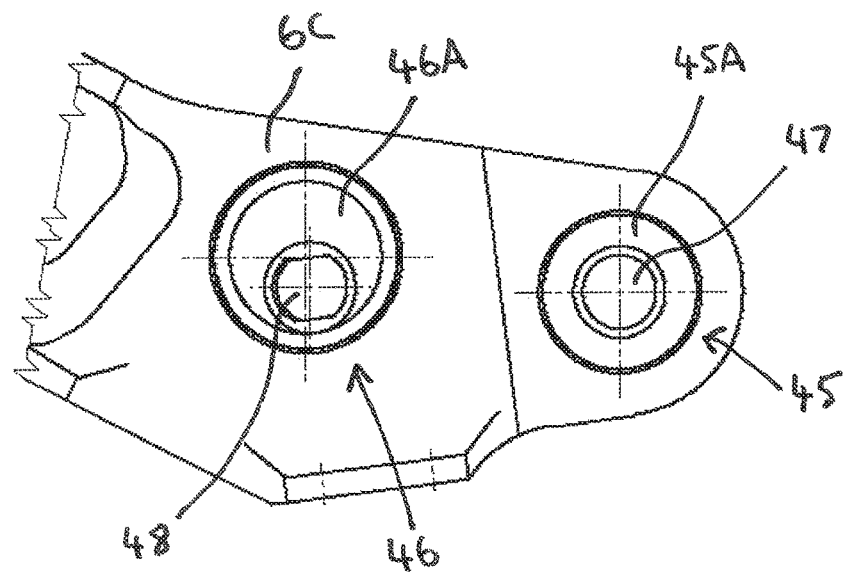
FIG. 17 is a side view of the track of FIG. 16, in the first position.
Figure 18:
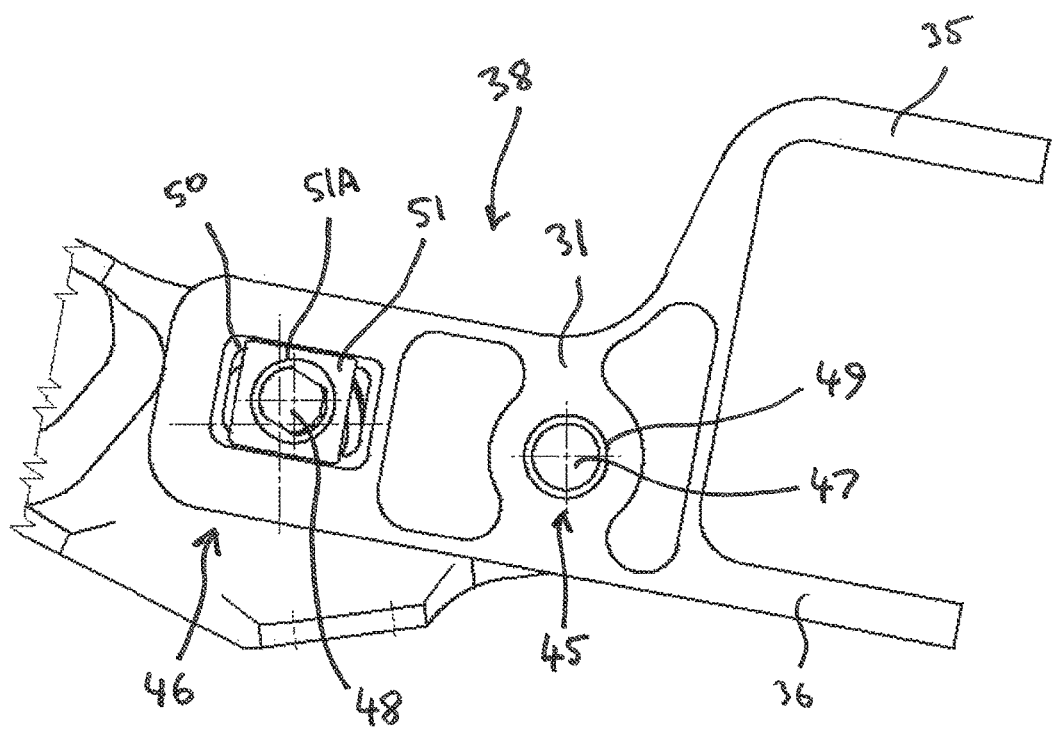
FIG. 18 is a side view of a portion of the coupling of FIG. 10, showing the track member in a second position relative to the track.
Figure 19:
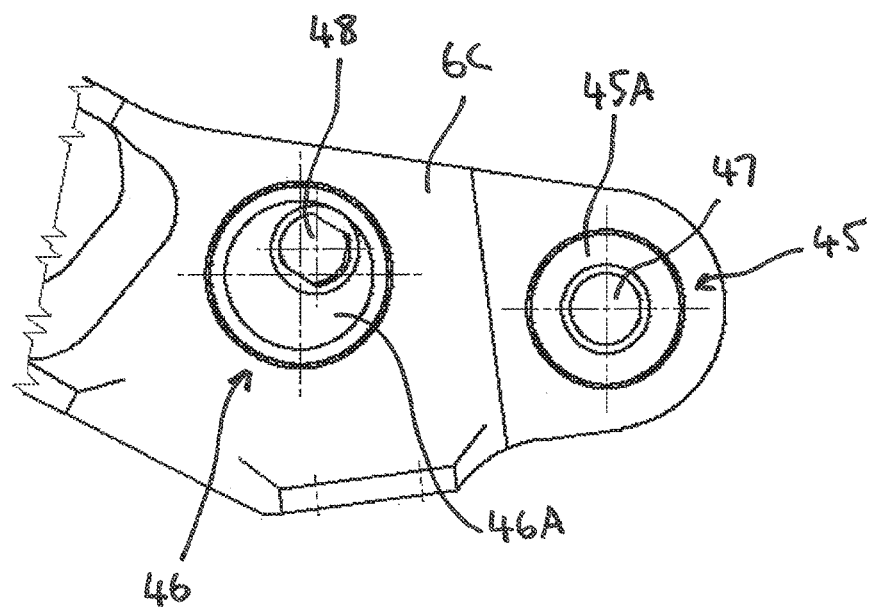
FIG. 19 is a side view of the track of FIG. 16, in the second position.

Referring to FIGS. 8 and 9, an alternative configuration of slave drop link 20 is shown. This alternative configuration of slave drop link 20 is disclosed in EP 2,669,191 and forms part of an aircraft wing assembly that is similar to the wing assembly 1A described above in reference to FIGS. 1 to 7B, with like features retaining the same reference numerals.

A difference between the slave drop link 10 described above in relation to FIGS. 1 to 7B and the slave drop link 20 shown in FIGS. 8 and 9 is that the slave drop link 20 comprises a first joint 21 having a pair of spaced yoke members 22 and a shaft (not shown) that is received between the yoke members 22. The shaft is slidable relative to the yoke members 22 in the spanwise direction X. An end of the second track 6B is fixedly attached to the yoke members 22 and the shaft is fixedly attached to a first slat mount 23 that extends from the slat 4. Therefore, movement of the slat 4 in the spanwise direction X causes the shaft to slide relative to the yoke members 22 such that the first mount 23 of the slat 4 slides relative to the second track 6B to alleviate the effects of out-of-plane bending of the wing body 2.

The slave drop link 20 further comprises a link arm 24. A first end of the link arm 24 is coupled to the second track 6B by a second joint 25, which is spaced from the first joint 21 along the second track 6B. A second, distal, end of the link arm 24 is coupled to the slat 4 by a third joint 26 which attaches the link arm 24 to a second slat mount 27 that extends from the slat 4.

A triangular truss is defined by the link arm 24, the portion of the second track 6B between the first and second joints 21, 25 and the portion of the slat 4 between the first and second slat mounts 23, 27. The triangular truss arrangement is necessary to allow for the slave drop link 20 to carry lift loads that are exerted on the slat 4, by preventing the slat 4 from rotating about the first joint 21 on an axis (not shown) extending parallel to the theoretical axis of the second track 6B about which the second track 6B rotates when the slat 4 is moved between the cruise and deployed positions.

The second joint 25, which couples the first end of the link arm 24 to the second track 6B, comprises a first spherical bearing 25A that is configured such that the link arm 24 is able to swing relative to the second track 6B in the spanwise direction X. The third joint 26, which couples the second end of the link arm 24 to the second slat mount 27, comprises a second spherical bearing 26A that is configured such that the link arm 24 is able to swing relative to the slat 4 in the spanwise direction X. Therefore, the second slat mount 27 is able to swing through an arc relative to the second track 6B about an axis that is perpendicular to the spanwise direction X to allow for movement of the slat 4 relative to the second track 6B in the spanwise direction X.

When the wing body 2 is in the rest position, the link arm 24 is substantially parallel to the chordwise direction Z (as shown in FIG. 9) and the first and second bearings 25A, 26A are aligned in the spanwise direction X.

When the wing body 2 is subjected to out-of plane bending, the first slat mount 23 slides in the spanwise direction X relative to the second track 6B and the second slat mount 27 swings about an arc relative to the second track 6B such that the slat 4 moves relative to the second track 6B in the spanwise direction and follows a complex path. This results in the link arm 24 swinging relative to the slat 4 and second track 6B such that the link arm 24 is angled with respect to the chordwise direction Z.

It has been found that the slave drop link 20 is not suited to applications wherein a large displacement between the slat and second track 6B is required. This is because the load exerted on the slave drop link 20, the slat 4 and the second track 6B increases as the angle between the link arm 24 and the chordwise direction Z increases. More specifically, as the slat 4 moves in a complex path to swing in an arc about the second coupling 25 due to out-of-plane bending such that the angle between the link arm 24 and the chordwise direction Z increases, the amount of spanwise loading being exerted on the slave drop link 20 will increase and an increasingly large tension load will be exerted on the link arm 24. This tension load requires reinforcement of the slave drop link 20 and the slat 4 and second track 6B, which increases the weight of the slave drop link 20. In addition, the amount of relative spanwise movement of the slat 4 relative to the second track 6B is limited by the range of tilting movement of the first and second spherical bearings 25A, 26A. Furthermore, when there is a large spanwise displacement between the slat 4 and the second track 6B the link arm 25 will abut the slat 4 and/or second track 6B such that the maximum swinging movement of slat 4 relative to the second track 6B is limited.

Therefore, the slave drop link 20 is not suitable for use in applications where a large relative displacement between the slat 4 and the second track 6B is required.

Embodiments of the invention will now be described, by way of example only, with reference to FIGS. 10 to 19.

Referring to FIGS. 10 to 19, a link 30 according to a first embodiment of the invention is shown. The link 30 couples a slat (not shown) to a second track 6B of the wing assembly.

The link 30 comprises a track member 31, a slat member 32 and an intermediate member 33. The track member 31 is fixedly mounted to the second track 6B and the slat member 32 is fixedly mounted to the slat. The intermediate member 33 is coupled between the track member 31 and slat member 32 such that the slat is coupled to the second track 6B.

The track member 31 comprises an attachment portion 34 and first and second arms 35, 36 that extend from the attachment portion 34.

The attachment portion 34 is generally cuboidal or box-shaped and comprises a slot 37 that extends into one end of the attachment portion 34. The second track 6B comprises a planar end 6C that is received in the slot 37 in the attachment portion 34 of the track member 31. When the planar end 6C is received in the slot 37, major surfaces (not shown) of the planar end 6C sit flush to respective internal major surfaces (not shown) of the attachment portion 34.

The track member 31 comprises a locking mechanism 38, described in more detail below, that rigidly locks the planar end 6C in position in the slot 37 such that the track member 31 is fixed relative to the second track 6B.

The first and second arms 35, 36 extend in parallel from an opposite side of the attachment portion 34 to the slot 37. The first and second arms 35, 36 are substantially planar and are spaced from one another in a direction perpendicular to the spanwise direction X. A pair of mounting holes 39 are formed through the thickness of the first and second arms 35, 36 respectively and are aligned such that they share a common axis.

The intermediate member 33 comprises a cuboidal or box-shaped main body 40. The main body 40 comprises opposite planar first and second surfaces 40A, 40B, and opposite planar third and fourth surfaces 40C, 40D. The first and second surfaces 40A, 40B are perpendicular to the third and fourth surfaces 40C, 40D. The first, second, third and fourth surfaces 40A, 40B, 40C, 40D each face in a direction that is perpendicular to the spanwise direction X.

A first pair of bearings 41 are mounted to the first and second surfaces 40A, 40B of the main body 40 and a second pair of bearings 42 are mounted to the third and fourth surfaces 40C, 40D of the main body 40. Therefore, the first pair of bearings 41 extend perpendicularly to the second pair of bearings 42 such that the intermediate member 33 is generally cruciform-shaped.

The first pair of bearings 41 each comprise an inner member 41A that is fixed relative to the main body 40 and an annular outer member 41B that is rotatably mounted to the inner member 41A. Each outer member 41B of the first pair of bearings 41 comprises a pair of flat peripheral edges 41C that are parallel and located on opposite sides of the corresponding inner member 41A. The second pair of bearings 42 each comprise an inner member (not shown) that is fixed relative to the main body 40 and an annular outer member (not shown) that is rotatably mounted to the inner member.

The slat member 32 comprises opposing first and second planar walls 32A, 32B and opposing third and fourth planar walls 32C, 32D. The first and second planar walls 32A, 32B each extend parallel to the spanwise direction X and face in a direction that is perpendicular to the spanwise direction X. The first and second planar walls 32A, 32B are perpendicular to the third and fourth planar walls 32C, 32D and are joined therewith such that the slat member 32 is generally cuboidal or box-shaped. The slat member 32 comprises a recess 43 that is located between the first, second, third and fourth planar walls 32A, 32B, 32C, 32D. A pair of slots 44 are formed through the thickness of the first and second planar walls 32A, 32B. Each of the pair of slots 44 comprises a pair of parallel edges 44A that extend linearly in the spanwise direction X.

The main body 40 of the intermediate member 33 is slidably received in the recess 43 in the slat member 32 such that a pair of flanged bushings (not shown) on the first and second surfaces 40A, 40B of the main body 40 sit flush to inside major surfaces of the first and second planar walls 32A, 32B respectively.

The first pair of bearings 41 form a pair of protrusions that project from the main body 40 and are slidably received in the pair of slots 44 in the slat member 32 such that the flat peripheral edges 41C of the outer members 41B of the first pair of bearings 41 sit flush to the parallel edges 44A of the pair of slots 44.

Therefore, the slat member 32 is slidable relative to the intermediate member 33 in the spanwise direction X. Furthermore, since each outer member 41B of the first pair of bearings 41 is rotatable relative to a respective inner member 41A, the slat member 32 is rotatable relative to the intermediate member 33 about a first rotational axis B-B that extends perpendicularly to the spanwise direction X.

The second pair of bearings 42 extend through the pair of mounting holes 39 in the first and second arms 35, 36 of the track member 31. The outer members of each of the second pair of bearings 42 are fixed relative to first and second arms 35, 36, for example, by adhesive or an interference fit. The inner members of the second pair of bearings 42 are rotatable relative to the outer member such that the main body 40 of the intermediate member 33 is rotatably mounted between the first and second arms 35, 36. Therefore, the intermediate member 33 is rotatable relative to the track member 31 about a second rotational axis C-C that is perpendicular to the first rotational axis B-B. The second pair of bearings 42 are configured such that the intermediate member 33 is only able to move relative to the first track member 31 by rotating about the second rotational axis C-C To assemble the link 30, the main body 40 of the intermediate member 33 is positioned inside the recess 43 in the slat member 32 such that the main body 40 is slidable therewith. The first pair of bearings 41 are then mounted to the first and second surfaces 40A, 40B of the main body 40 such that the first pair of bearings 41 are slidably received in the pair of slots 44 in the first and second planar walls 32A, 32B of the slat member 32. The first pair of bearings 41 may be attached to the first and second surfaces 40A, 40B of the main body 40 by, for example, an adhesive or by screwing a threaded portion (not shown) of each of the first pair of bearings 41 into a corresponding threaded aperture (not shown) in the main body 40.

Next, the slat member 32 and intermediate member 33 are positioned between the first and second arms 35, 36 of the track member 31 such that the main body 40 of the intermediate member 33 is disposed between the pair of mounting holes 39 in the first and second arms 35, 36. The second pair of bearings 42 are then mounted to the corresponding third and fourth surfaces 40C, 40D of the main body 40. The second pair of bearings 42 are mounted to the main body 40 in a similar manner to the first pair of bearings 41, as described above. The outer members of the second pair of bearings 42 are then fixed to the first and second arms 35, 36 such that intermediate member 33 is constrained from moving relative to the track member 31 in any direction apart from rotationally about the second rotational axis C-C. Therefore, the intermediate member 33 and slat member 32 are rotatable relative to the track member about the second rotational axis C-C and the intermediate member 33 and track member 31 are rotatable relative to the slat member 32 about the first rotational axis B-B and slidable relative to the slat member 32 in the spanwise direction X such that the slat member 32 is constrained to three degrees-of-freedom relative to the track member 31. The second rotational axis C-C is perpendicular to the first rotational axis B-B and the spanwise direction X.

The track member 31 is then mounted to the planar end 6C of the second track 6B by locking mechanism 38, in the manner described in more detail below, such that the link 30 is mounted to the aircraft structure. The slat (not shown) comprises a pair of slat mounts (not shown) that extend in parallel from the slat. The slat mounts are received against the third and fourth planar walls 32C, 32D of the slat member 32. The third and fourth planar walls 32C, 32D each comprise a plurality of bolt holes 32E such that the slat mounts can be bolted to the slat member 32. Therefore, the link 30 couples the slat to the second track 6B such that the slat is slidable relative to the second track 6B in the spanwise direction X and is rotatable relative to the second track 6B about the first rotational axis B-B and second rotational axis C-C.

The intermediate member 33 of the link 30 is configured such that the track member 31 is not able to rotate relative to the slat member 32 about any axis that extends parallel to the theoretical axis (not shown) of the second track 6B about which the second track 6B rotates between the cruise and deployed positions. More specifically, the second pair of bearings 42 rotatably mount the third and fourth surfaces 40C, 40D of the main body 40 to the first and second arms 35, 36 so that the intermediate member 33 is only able to move relative to the first track member 31 by rotating about the second rotational axis C-C. Additionally, the pair of flanged bushings (not shown) located on first and second surfaces 40A, 40B of the main body 40 of the intermediate member 33 sit flush to the internal major surfaces of the first and second planar walls 32A, 32B of the slat mount 32 so that the only possible movement of the intermediate member 33 relative to the slat mount 32 is sliding movement in the spanwise direction X and rotational movement about the first rotational axis B-B. Therefore, the link 30 is able to carry in-plane loads, for example drag loads (shown by arrow FH in FIG. 15), and out-of-plane loads, for example lift loads (shown by arrow FV in FIG. 15), without requiring a separate lift arm that forms a triangular truss arrangement. In an alternate embodiment, the pair of flanged bushings are omitted and instead the first and second surfaces 40A, 40B of the main body 40 sit flush to the internal major surfaces of the first and second planar walls 32A, 32B of the slat mount 32.

Since the configuration of the intermediate member 33 negates the requirement for a separate link arm to carry out-of plane loads, the entire slat is able to slide relative to the second track 6B along a linear path in the spanwise direction X without any part of the slat having to swing through an arc relative to the second track 6B. Since said arcuate movement of the slat relative to the second track 6B is avoided, the link 30 is suitable where large spanwise displacements between the slat and the second track 6B are required.

Furthermore, the link 30 does not require any spherical bearings to provide the spanwise movement between the slat and the second track 6B and so the range of spanwise movement is increased in comparison to the known slave drop links 10, 20 described above in relation to FIGS. 1 to 9.

Referring to FIGS. 16 to 19, the locking mechanism 38 that fixes the position of the track member 31 relative to the second track 6B is shown in more detail. The locking mechanism 38 comprises first and second bearings 45, 46 that are located in the planar end 6C of the second track 6B. The first bearing 45 is located proximate to the tip of the planar end 6C of the second track 6B and the second bearing 46 is located on the other side of the first bearing 45 to said tip.

The first and second bearings 45, 46 each comprise a respective circular-shaped central portion 45A, 46A that extends through the thickness of the planar end 6C of the second track 6B. The central portions 45A, 46A of the first and second bearings 45, 46 are each rotatable about a corresponding rotational axis (not shown) that extends parallel to the spanwise direction X.

A pair of pivot pins 47 extend from the central portion 45A of the first bearing 45 on opposite sides of the planar end 6C of the second track 6B. The pivot pins 47 are aligned coaxially with the rotational axis of the central portion 45A of the first bearing 45.

A pair of adjustment pins 48 extend from the central portion 46A of the second bearing 46 on opposite sides of the planar end 6C of the second track 6B. The adjustment pins 48 are eccentrically mounted to the central portion 46A of the second bearing 46 such that the adjustment pins 48 are offset from the rotational axis of the central portion 46A.

The locking mechanism 38 further comprises first and second pairs of apertures 49, 50 that are formed in the attachment portion 34 of the track member 31. The first pair of apertures 49 are circular and are located on opposite sides of the slot 37 in the attachment portion 34 to each receive a respective pivot pin 47 such that the track member 31 is rotatably mounted to the second track 6B about the rotational axis of the first bearing 45.

The second pair of apertures 50 are generally rectangular and are located on opposite sides of the slot 37 in the attachment portion 34. A sliding member 51 is slidably received in each of the second pair of apertures 50. Each sliding member 51 is substantially rectangular and comprises a circular recess 51A. Each adjustment pin 48 is received in the circular recess 51A of a corresponding sliding member 51. An end of each adjustment pin 48 protrudes from the corresponding sliding member 51 such that a bolt 52 can be tightened to each of the adjustment pins 48.

Rotation of the central portion 46A of the second bearing 46 alters the position of the eccentrically mounted adjustment pins 48 such that the position of the track member 31 relative to the second track 6B about the axis of the pivot pins 47 is adjusted. More specifically, rotation of the central portion 46A of the second bearing 46 results in the adjustment pins 48 moving in the chordwise direction Z and in the out-of-plane direction Y relative to the planar end 6C of the second track 6B. The sliding members 51 slidably move in the respective second pair of apertures 50 to facilitate movement of the adjustment pins 48 in the chordwise direction Z relative to the second track 6B and track member 31. Movement of the adjustment pins 48 in the out-of-plane direction Y causes the track mount 31 to be urged to rotate about the rotational axis of the pivot pins 47 such that the track member 31 rotates from a first position (shown in FIG. 16) to a second position (shown in FIG. 18). Therefore, the locking mechanism 38 allows for the position of the slat and track member 31 relative to the second track 6B to be finely adjusted after the slat has been coupled to the second track 6B. Bolts 52 are then tightened to the pivot pins 47 and adjustment pins 48 to fix the track member 31 and slat 4 in position relative to the second track 6B.

In an alternative embodiment, the track member 31 is integrally formed with the second track 6B and/or the slat member 32 is integrally formed with the slat.

Although in the above described embodiment the track member 31 comprises first and second arms 35, 36 and the slat member 32 is received between the first and second arms 35, 36, in an alternate embodiment (not shown) the slat member comprises first and second arms and the track member is received therebetween. In one such embodiment, the track member is generally box-shaped and comprises parallel first and second planar walls and parallel third and fourth planar walls with a recess therebetween. In such an embodiment, the intermediate member is slidably received in the recess in the track member and is rotatably coupled between the first and second arms of the slat member.

Although in the above described embodiments the track member 31 or slat member 32 comprises first and second arms, in an alternate embodiment (not shown) one of the first and second arms is omitted.

Although in the above described embodiments the aircraft structure is in the form of a wing assembly 1A, it should be recognized that the present invention is suitable for use with other aircraft structures. Furthermore, although in the above described embodiments the slat member 32 configured to be fixed relative to a lift device in the form of a slat, in alternate embodiments (not shown), the slat member is configured to be fixed relative to a different type of lift device, for example, an aileron, elevator, spoiler, flap, Krueger flap, or rudder.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

I claim:

1. A link for coupling an aircraft lift device to a track that is deployable along an arc about an axis of rotation comprising:
   a track member configured to be fixed relative to said track,
   a lift device member configured to be fixed relative to said lift device, and
   an intermediate member that couples the track member to the lift device member,
   wherein the link is configured to allow for sliding movement of the lift device member relative to the track member such that the lift device is slidable along a linear path relative to the track in a direction of the axis of rotation of the track.

2. The link according to claim 1, wherein one of the lift device member is slidable relative to the intermediate member.

3. The link according to claim 2, wherein the lift device member comprises a recess, and the intermediate member is slidably received in the recess.

4. A link for coupling an aircraft lift device to a track that is deployable about an axis of rotation comprising:
   a track member to be fixed relative to said track,
   a lift device member configured to be fixed relative to said lift device, and
   an intermediate member that couples the track member to the lift device member,
   wherein the lift device member is slidable relative to the intermediate member;
   wherein the link is configured to allow for sliding movement of the lift device member relative to the track member such that the lift device is slidable along a linear path relative to the track in a direction of the axis of rotation of the track,
   wherein the the track member is rotatable relative to the intermediate member about a first axis.

5. The link according to claim 4, wherein the track member comprises first and second arms, and the intermediate member is rotatably received between the first and second arms such that the first axis extends therebetween.

6. The link according to claim 4, wherein the lift device member is rotatable relative to the intermediate member about a second axis perpendicular to the first axis.

7. The link according to claim 6, wherein the first and second axes are perpendicular to the axis of rotation of said track.

8. The link according to claim 2, wherein the lift device member comprises a slot, and the intermediate member comprises a protrusion that slidably engages the slot.

9. The link according to claim 8, wherein the lift device member comprises an opposing pair of slots and the intermediate member comprises a pair of protrusions that are configured to each slidably engage with a respective slot.

10. The link according to claim 2, wherein the one of the track member and lift device member is generally box-shaped.

11. The link according to claim 1, wherein the intermediate member is configured to restrict the lift device from rotating relative to said track about any axis that is parallel to the axis of rotation of said track.

12. The link according to claim 1, wherein the intermediate member is generally cruciform shaped.

13. The link according to claim 1, wherein the track member is coupled to the track by a first pin and a second pin.

14. The link according to claim 13, wherein the first pin comprises an eccentric member configured to allow for adjustment of an angle of the track member relative to the track about a rotational axis of the second pin before the track member has been fixed relative to the track.

15. A link for coupling an aircraft lift device to a track that is deployable along an arc about an axis of rotation comprising:
   a track member to be fixed relative to said track,
   a lift device member configured to be fixed relative to said lift device, and
   an intermediate member that couples the track member to the lift device member,
   wherein the link is configured to allow for sliding movement of the lift device member relative to the track member such that the lift device is slidable along a linear path relative to the track in a direction of the axis of rotation of the track;
   wherein the link is configured such that the track member is constrained to three degrees of freedom relative to the lift device member.

16. The link according to claim 1, wherein the lift device member comprises a plurality of bolt holes for attachment of the lift device to the lift device member.

17. The link according to claim 1, wherein when the lift device is mounted to the lift device member no further attachment of the lift device is required to secure the lift device to the track.

18. The link according to claim 1 for coupling a slat to a slat track.

19. An aircraft structure comprising:
a link,
an aircraft lift device, and
a track that is deployable along an arc about an axis of rotation,
wherein the link couples the aircraft lift device to the track and the link comprises:
   a track member fixed relative to said track,
   a lift device member fixed relative to said lift device, and
   an intermediate member that couples the track member to the lift device member,
   wherein the link is configured to allow for sliding movement of the lift device member relative to the track member such that said lift device is slidable along a linear path relative to said track in a direction of the axis of rotation of said track.

20. An aircraft structure comprising:
a link, an aircraft lift device, and a track that is deployable about an axis of rotation, wherein the link couples the aircraft lift device to the track and comprises a track member fixed relative to the track,
a lift device member fixed relative to said lift device, and
an intermediate member that couples the track member to the lift device member,
   wherein the link is configured to allow for sliding movement of the lift device member relative to the track member such that said lift device is slidable along a linear path relative to said track in a direction of the axis of rotation of said track,
   wherein the lift device member is slidable relative to the intermediate member, and wherein the track member is rotatable relative to the intermediate member about a first axis and the lift device member is rotatable relative to the intermediate member about a second axis perpendicular to the first axis, and
   wherein the lift device member comprises a slot and the intermediate member comprises a protrusion that slidably engages with the slot, wherein the protrusion is rotatably received in the slot such that the lift device member is rotatable relative to the intermediate member about the second axis.

21. The link according to claim 1 wherein the track includes a beam oriented perpendicular to the axis of rotation.

22. The link according to claim 21 wherein the beam is curved along a lengthwise direction of the beam.

23. The link according to claim 1 wherein the aircraft lift device is deployable and the track aligned with direction of deployment of the lift device.

\* \* \* \* \*